US006720516B2

(12) United States Patent
Yamada et al.

(10) Patent No.: US 6,720,516 B2
(45) Date of Patent: Apr. 13, 2004

(54) APPARATUS FOR ELECTRIC DISCHARGE MICROMACHINING OF A MICRO-DIAMETER HOLE (75) Inventors: Yoshio Yamada, Hyogo (JP); Takeshi Masaki, Osaka (JP); Toru Nakagawa, Osaka (JP); Hiroyuki Nakata, Osaka (JP); Hirofumi Yasumoto, Nara (JP); Toshihiko Wada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/017,364

(22) Filed: Dec. 12, 2001

(65) Prior Publication Data
US 2002/0117478 A1 Aug. 29, 2002

(30) Foreign Application Priority Data

Dec. 12, 2000 (JP) .......................... 2000-377301
May 24, 2001 (JP) .......................... 2001-154709

(51) Int. Cl.[7] .............................................. B23H 1/02
(52) U.S. Cl. ................... 219/69.13; 219/69.19
(58) Field of Search ........................ 219/69.13, 69.19, 219/69.18, 69.2

(56) References Cited

U.S. PATENT DOCUMENTS

| | | | | |
|---|---|---|---|---|
| 3,435,176 A | * | 3/1969 | Lobur | |
| 3,614,368 A | * | 10/1971 | Lobur | ...................... 219/69.18 |
| 3,725,631 A | * | 4/1973 | Angelucci et al. | .......... 219/69.2 |
| 3,778,579 A | * | 12/1973 | Takarada | .................. 219/69.19 |
| 3,809,847 A | * | 5/1974 | Bell, Jr. | ..................... 219/69.13 |
| 4,292,490 A | * | 9/1981 | Bell et al. | ................. 219/69.18 |
| 4,853,512 A | * | 8/1989 | Scheider | .................. 219/69.15 |
| 5,111,017 A | * | 5/1992 | Futamura et al. | ......... 219/69.18 |
| 6,590,178 B2 | * | 7/2003 | Shih | .......................... 219/69.2 |

FOREIGN PATENT DOCUMENTS

JP        61-219520 A   *   9/1986  ............... 219/69.13

* cited by examiner

Primary Examiner—Geoffrey S. Evans
(74) Attorney, Agent, or Firm—RatnerPrestia (57) ABSTRACT An electrode discharge machining apparatus includes a first holder for holding a workpiece to be subjected to electro discharge machining, an electrode provided opposing the workpiece held by the first holder, a capacitor for supplying electric charge to the electrode and the workpiece so as to generate pulse electro discharge between the workpiece and the electrode, a power source for applying a voltage to the capacitor, a switching element provided between the capacitor, and at least one of the electrode, the workpiece and the power source, a switch controller for controlling on and off of the switching element, a current detecting element for detecting a current flowing between the workpiece and the electrode, and a control unit for, based on the current detected by the current detecting element, judging whether or not a short circuit occurs between the workpiece and the electrode. When it is judged that a short circuit occurs between the workpiece and the electrode, the switch controller switches off the switching element for a predetermined time. Use macro to add file identifier.

14 Claims, 10 Drawing Sheets

APPARATUS FOR ELECTRIC DISCHARGE MICROMACHINING OF A MICRO-DIAMETER HOLE

BACKGROUND OF THE INVENTION

1. Field of the Invention

The present invention relates to a method and apparatus for electro discharge machining. More particularly, the present invention relates to a method and apparatus for electro discharge micromachining used to machine a micro-diameter hole of a nozzle for discharging ink used for an ink-jet printer, a hole of a nozzle for producing a chemical fiber, a fuel injection nozzle used for an automobile engine, and the like.

2. Description of the Related Art

Recently, a hole of a nozzle for discharging ink used for an ink-jet printer, a nozzle for discharging material used for a chemical fiber production machine, a fuel injection nozzle used for an automobile engine, or the like, are becoming smaller and more precise. As such, there is a demand for hole machining capable of producing a number of nozzle holes having such a small diameter and precise geometry. Such machining typically requires several hours and high-precision positioning.

To achieve such high-precision hole machining, an electro discharge micromachining apparatus capable of hole micromachining using electro discharge may be employed. Such an electro discharge micromachining apparatus is provided with an electro discharge machining apparatus capable of controlling an electro discharge operation of the electro discharge micromachining apparatus with high precision so as to machine a microhole with electro discharge.

Figure 8:
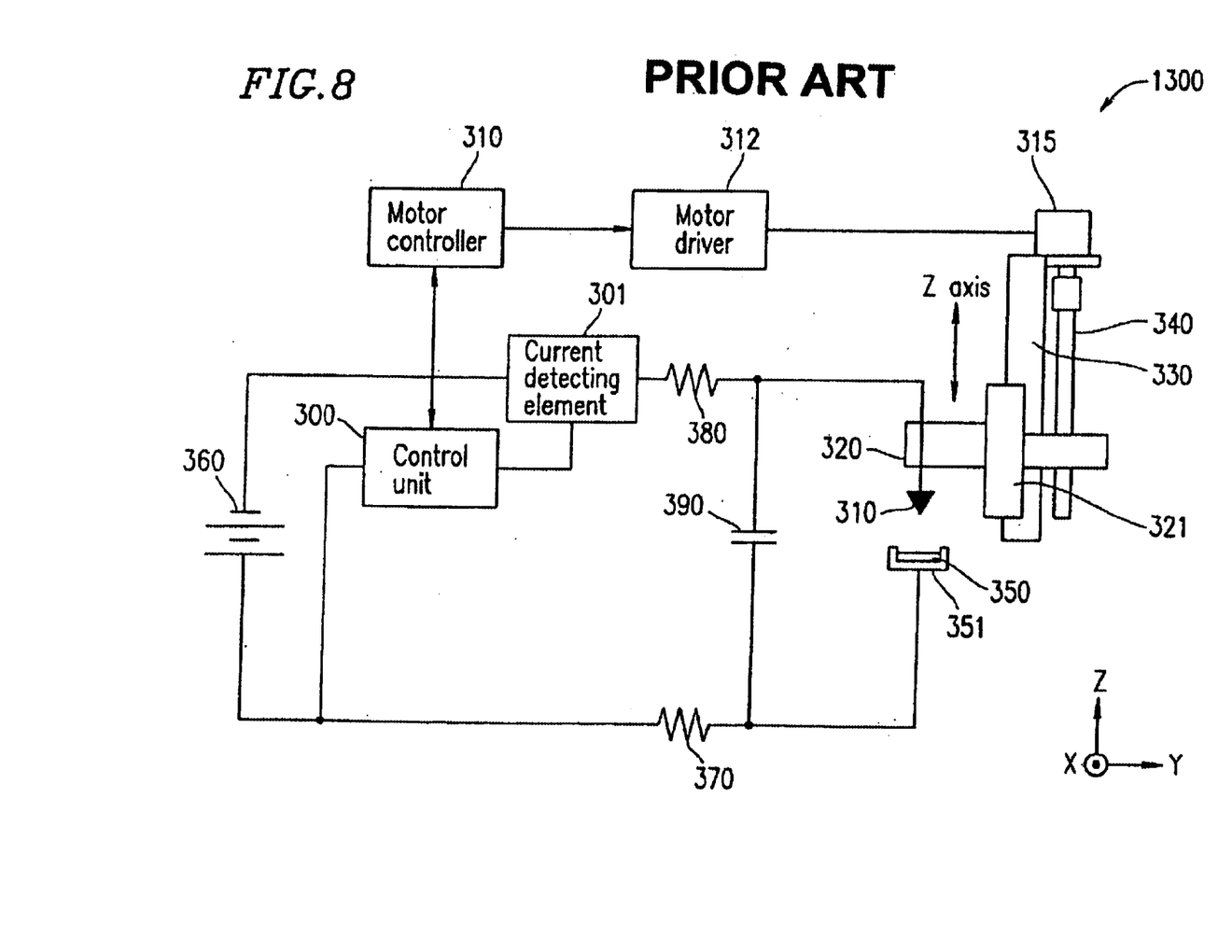
FIG. 8 is a diagram showing a conventional electro discharge machining apparatus.

FIG. 8 shows a conventional electro discharge machining apparatus 1300. The electro discharge machining apparatus 1300 comprises: a holder 351 for holding a workpiece 350 to be subjected to electro discharge machining; an electrode 310 provided opposing the workpiece 350 held by the holder 351; a head 320 for holding the electrode 310; a capacitor 390 for supplying electric charge to the electrode 310 and the workpiece 350; a power source 360 for applying a voltage between opposite ends of the capacitor 390; electric resistances 370 and 380 provided between the capacitor 390 and the power source 360; a current detecting element 301 for detecting a current flowing between the workpiece 350 and the electrode 310; a control unit 300 for judging whether a short circuit occurs between the electrode 310 and the workpiece 350; a table 321 for supporting the head 320; a linear guide 330 capable of sliding in a Z axis direction for supporting the table 321; a ball screw 340 for sliding the table 321 in the Z axis direction due to axial rotation; a motor 315 for rotating the ball screw 340 about an axis of the ball screw 340; a motor driver 312 for driving the motor 315; and a motor controller 310 for instructing the motor driver 312 to drive the motor 315. The holder 351 may be a machining vessel supplied with a machining liquid.

The power source 360 which is a direct current power source applies a voltage between the opposite ends of the capacitor 390, so that electric charge is accumulated in the capacitor 390 in accordance with a charge time constant. The charge time constant is determined based on values of the electric resistances 370, 380 and the capacitor 390. The electric charge accumulated in the capacitor 390 is supplied to the electrode 310 and the workpiece 350, so that electro discharge occurs between the electrode 310 and the workpiece 350. Repetition of accumulation of electric charge to the capacitor 390 and supply of the accumulated electric charge to the electrode 310 and the workpiece 350 in accordance with the charge time constant leads to generation of pulse electro discharge between the electrode 310 and the workpiece 350. The workpiece 350 is machined by the pulse electro discharge.

Machining of the workpiece 350 is initiated by a machining initiation command by a user's key input, for example. The machining initiation command leads to accumulation of electric charge into the capacitor 390, while the motor controller 310 outputs to the motor driver 312 a command to drive the motor 315 so as to move the electrode 310 downward. The motor drive causes the distance between the electrode 310 and the workpiece 350 to be small. When the distance becomes such that an electro discharge can be generated, pulse electro discharge is generated between the electrode 310 and the workpiece 350 to start machining of the workpiece 350.

In the electro discharge machining apparatus 1300, the current detecting element 301 detects a current flowing between the power source 360 and the capacitor 390. The current detecting element 301 may also detect a voltage between the electrode 310 and the workpiece 350. The current detecting element 301 outputs a result of detecting the current to the control unit 300.

The control unit 300 judges, based on the current detecting result, whether a short circuit occurs between the electrode 310 and the workpiece 350. If the control unit 300 judges that a short circuit occurs, the control unit 300 outputs a short circuit detection signal indicating the short circuit state to the motor controller 310. In accordance with the short circuit detection signal, the motor controller 310 outputs to the motor driver 312 a command to drive the motor 315 so as to elevate the workpiece 390 as long as a short circuit continues between the electrode 310 and the workpiece 350. The electrode 310 continues to be elevated in the Z axis direction until the short circuit halts between the workpiece 350 and the electrode 310.

When by the elevation of the electrode 310 in the Z axis direction, a mechanical isolation distance between the workpiece 350 and the electrode 310 is secured, the short circuit halts. When the control unit 300 detects the halt of the short circuit, the motor driver 312 drives the motor 315 to move the electrode 310 downward to a position for initiation of electro discharge, so that electro discharge machining is resumed and continued.

By the above-described electro discharge operation, electro discharge machining is carried out for the workpiece 350.

To achieve a high level of roundness in hole machining, the electrode 310 is rotated by a spindle motor during electro discharge machining. Typically, such machining is carried out for several hours.

However, in the above-described conventional electro discharge machining apparatus 1300, every time a short circuit occurs, the electrode 310 moves upward and downward so as to halt the short circuit. Such upward and downward operations require much time, leading to an increase in the time required for overall machining processes.

Further, in the electro discharge machining apparatus 1300, a high voltage remains applied between the workpiece 350 and the electrode 310 during a period of time from detection of the occurrence of a short circuit to restart of electro discharge machining. When a machining liquid (e.g., deionized water) supplied into the holder 351 (i.e., a machining vessel) is used to cool heat generated by electro discharge and remove swarfs during electro discharge machining, electrolysis occurs between the workpiece 350 and the electrode 310 due to a high voltage applied between the workpiece 350 and the electrode 310. Abnormal machining occurs due to the generation of electrolysis in addition to intended machining, leading to a reduction in quality of the machined workpiece 350.

Moreover, in the electro discharge machining apparatus 1300, the continuous rotation of the motor 315 and the spindle motor generates heat which in turn propagates through the head 320, the ball screw 340, or the linear guide 330 made of stainless steel, casting iron (FC material), or the like which, as a result, thermally expands. Such thermal expansion causes displacement of the electrode 310, leading to a reduction in machining precision. For example, it is assumed that the head 320 is made of stainless steel having the coefficient of thermal expansion of $17 \times 10^{-6}$ and has a length of about 50 mm. In this case, when the temperature of the head 320 is increased, for example, by three degrees due to heat generated by the spindle motor, the electrode 310 will be displaced from a machining position by 2.5 $\mu$m.

The present invention is provided to solve the above-described conventional problems. An objective of the present invention is to instantaneously halt a short circuit between a workpiece and an electrode or to prevent occurrence of a short circuit between the workpiece and the electrode, thereby improving a machining rate. Another objective of the present invention is to, in electro discharge machining, use a machining liquid, such as for example deionized water, to prevent electrolysis of an electrode and a workpiece which would otherwise cause abnormal machining, thereby improving the machining quality of the workpiece. Still another objective of the present invention is to prevent displacement of an electrode due to heat generation of a motor during a long machining operation, thereby achieving high-precision positioning of the electrode.

SUMMARY OF THE INVENTION

According to one aspect of the present invention, an electro discharge machining apparatus comprises a first holder for holding a workpiece to be subjected to electro discharge machining, an electrode provided opposing the workpiece held by the first holder, a capacitor for supplying electric charge to the electrode and the workpiece so as to generate pulse electro discharge between the workpiece and the electrode, a power source for applying a voltage to the capacitor, a switching element provided between the capacitor, and at least one of the electrode, the workpiece and the power source, a switch controller for controlling on and off of the switching element, a current detecting element for detecting a current flowing between the workpiece and the electrode, and a control unit for, based on the current detected by the current detecting element, judging whether or not a short circuit occurs between the workpiece and the electrode. When it is judged that a short circuit occurs between the workpiece and the electrode, the switch controller switches off the switching element for a predetermined time.

In one embodiment of this invention, the electro discharge machining apparatus further comprises a drive control unit for moving a position of the electrode. When it is judged that a short circuit occurs between the workpiece and the electrode, the drive control unit moves the position of the electrode so that a distance between the workpiece and the electrode is increased.

In one embodiment of this invention, the electro discharge machining apparatus further comprises a motor for rotating the electrode, and a second holder for holding the motor and the electrode. The second holder is made of a low thermal expansive substance.

In one embodiment of this invention, the coefficient of thermal expansion of the low thermal expansive substance is $5 \times 10^{-6}$ or less.

In one embodiment of this invention, the low thermal expansive substance is an invar alloy.

In one embodiment of this invention, the electro discharge machining apparatus further comprises a motor for rotating the electrode, and a second holder for holding the motor and the electrode. An thermal isolator is equipped between the motor and the second holder.

In one embodiment of this invention, the electro discharge machining apparatus further comprises a motor for rotating the electrode, and a second holder for holding the electrode. Space is set between the motor and the second holder.

According to another aspect of the present invention, an electro discharge machining apparatus comprises a first holder for holding a workpiece to be subjected to electro discharge machining, an electrode provided opposing the workpiece held by the first holder, a capacitor for supplying electric charge to the electrode and the workpiece so as to generate pulse electro discharge between the workpiece and the electrode, a power source for applying a voltage to the capacitor, a switching element provided between the capacitor, and at least one of the electrode, the workpiece and the power source, and a switch controller for controlling on and off of the switching element. The switching element alternately is turned on and off so that duration of the pulse electro discharge is less than or equal to a predetermined time.

In one embodiment of this invention, the predetermined time is a time from the beginning of the pulse electro discharge to the onset of electrolysis in one of the electrode and the workpiece.

In one embodiment of this invention, the electro discharge machining apparatus further comprises a motor for rotating the electrode, and a second holder for holding the motor and the electrode. The second holder is made of a low thermal expansive substance.

In one embodiment of this invention, the coefficient of thermal expansion of the low thermal expansive substance is $5 \times 10^{-6}$ or less.

In one embodiment of this invention, the low thermal expansive substance is an invar alloy.

In one embodiment of this invention, the electro discharge machining apparatus further comprises a motor for rotating the electrode, and a second holder for holding the motor and the electrode. An thermal isolator is equipped between the motor and the second holder.

In one embodiment of this invention, the electro discharge machining apparatus further comprises a motor for rotating the electrode, and a second holder for holding the electrode. Space is set between the motor and the second holder.

According to another aspect of the present invention, an electro discharge machining apparatus comprises a first holder for holding a workpiece to be subjected to electro discharge machining, an electrode provided opposing the workpiece held by the first holder, a capacitor for supplying electric charge to the electrode and the workpiece so as to generate pulse electro discharge between the workpiece and the electrode, a power source for applying a voltage to the capacitor, a current detecting element for detecting a current flowing between the workpiece and the electrode, a control unit for, based on the current detected by the current detecting element, judging whether or not a period of the pulse electro discharge is less than or equal to a predetermined period, and an adjuster for, when it is judged that the period of the pulse electro discharge is less than or equal to the predetermined period, adjusting an electric resistance value between the power source and the capacitor so that the period of the pulse electro discharge is greater than the predetermined period.

In one embodiment of this invention, the electro discharge machining apparatus further comprises a motor for rotating the electrode, and a second holder for holding the motor and the electrode. The second holder is made of a low thermal expansive substance.

In one embodiment of this invention, the coefficient of thermal expansion of the low thermal expansive substance is $5 \times 10^6$ or less.

In one embodiment of this invention, the low thermal expansive substance is an invar alloy.

In one embodiment of this invention, the electro discharge machining apparatus further comprises a motor for rotating the electrode, and a second holder for holding the motor and the electrode. An thermal isolator is equipped between the motor and the second holder.

In one embodiment of this invention, the electro discharge machining apparatus further comprises a motor for rotating the electrode, and a second holder for holding the electrode. Space is set between the motor and the second holder.

According to another aspect of the present invention, an electro discharge machining apparatus comprises a first holder for holding a workpiece to be subjected to electro discharge machining, an electrode provided opposing the workpiece held by the first holder, a capacitor for supplying electric charge to the electrode and the workpiece so as to generate pulse electro discharge between the workpiece and the electrode, a power source for applying a voltage to the capacitor, a current detecting element for detecting a current flowing between the workpiece and the electrode, a control unit for, based on the current detected by the current detecting element, judging whether or not a short circuit has occurred for a predetermined time between the workpiece and the electrode, and an adjuster for, when it is judged that a short circuit has occurred for the predetermined time between the workpiece and the electrode, adjusting an electric resistance value between the power source and the capacitor so that a period of the pulse electro discharge is elongated.

In one embodiment of this invention, the electro discharge machining apparatus further comprises a motor for rotating the electrode, and a second holder for holding the motor and the electrode. The second holder is made of a low thermal expansive substance.

In one embodiment of this invention, the coefficient of thermal expansion of the low thermal expansive substance is $5 \times 10^{-6}$ or less.

In one embodiment of this invention, the low thermal expansive substance is an invar alloy.

In one embodiment of this invention, the electro discharge machining apparatus further comprises a motor for rotating the electrode, and a second holder for holding the motor and the electrode. An thermal isolator is equipped between the motor and the second holder.

In one embodiment of this invention, the electro discharge machining apparatus further comprises a motor for rotating the electrode, and a second holder for holding the electrode. Space is set between the motor and the second holder.

DESCRIPTION OF THE PREFERRED EMBODIMENTS

Hereinafter, the present invention will be described by way of illustrative examples with reference to the accompanying drawings.

EXAMPLE 1

Figure 1A:
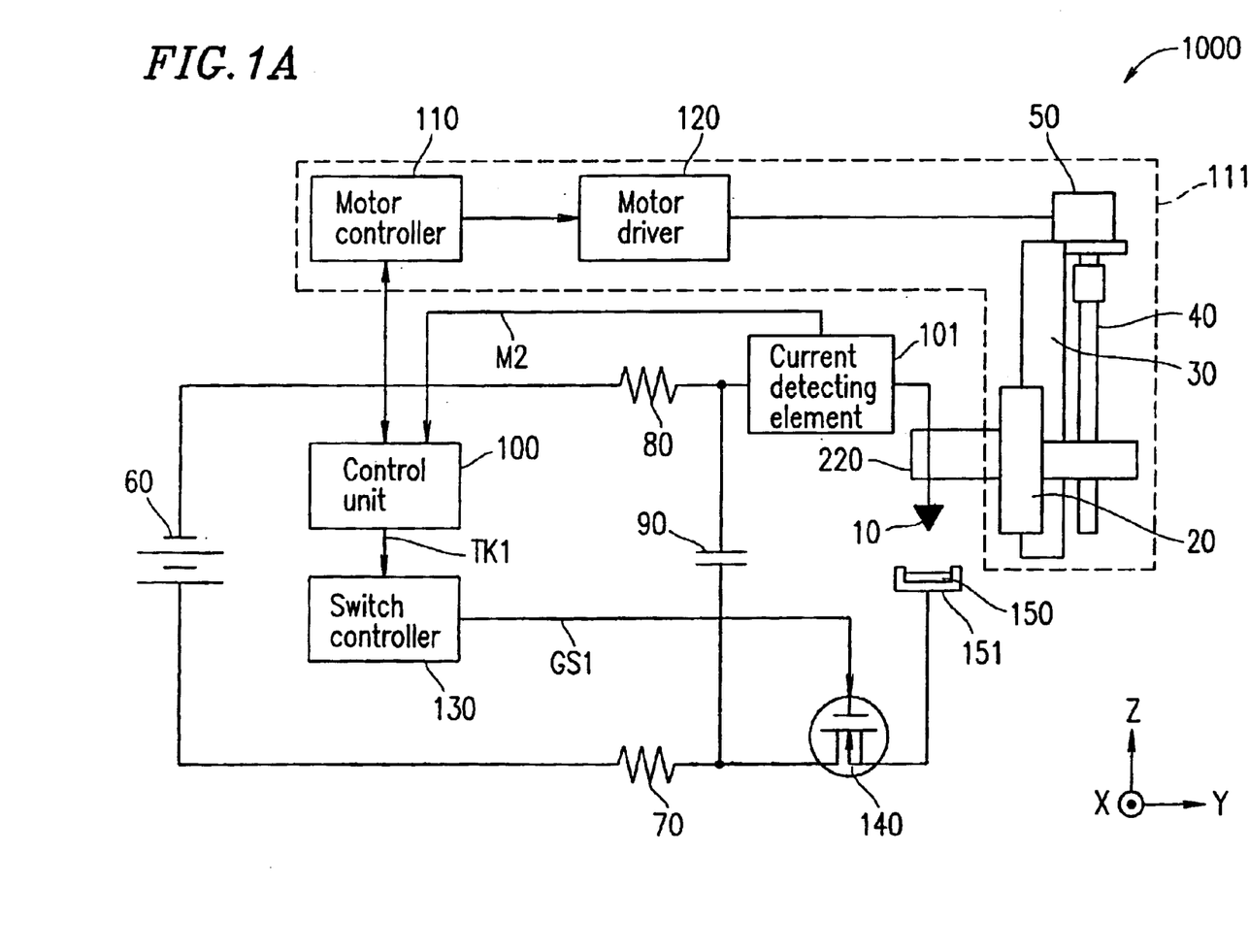
FIG. 1A is a diagram showing an electro discharge machining apparatus according to Example 1 of the present invention.

FIG. 1A shows an electro discharge machining apparatus 1000 according to Example 1 of the present invention. The electro discharge machining apparatus 1000 may be an electro discharge micromachining apparatus.

The electro discharge machining apparatus 1000 comprises: a holder 151 for holding a workpiece 150 to be subjected to electro discharge machining; an electrode 10 provided opposing the workpiece 150 held by the holder 151; a head 220 for holding the electrode 10; a capacitor 90 for supplying electric charge to the electrode 10 and the workpiece 150; a power source 60 for applying a voltage between opposite ends of the capacitor 90; electric resistances 70 and 80 provided between the capacitor 90 and the power source 60; a switching element 140 provided between the capacitor 90 and the workpiece 150; a switch controller 130 for controlling on and off of the switching element 140; a current detecting element 101 for detecting a current flowing between the workpiece 150 and the electrode 10; a control unit 100 for judging whether a short circuit occurs between the electrode 10 and the workpiece 150; and a shift controller 111 for shifting a position of the electrode 10 held by the head 220. The holder 151 may be a machining vessel supplied with a machining liquid. The shift controller 111 comprises: a table 20 for supporting the head 220; a linear guide 30 capable of sliding in a Z axis direction for supporting the table 20; a ball screw 40 for sliding the table 20 in the Z axis direction due to axial rotation; a motor 50 for rotating the ball screw 40 about an axis of the ball screw 40; a motor driver 120 for driving the motor 50; and a motor controller 110 for instructing the motor driver 120 to drive the motor 50. An operation of the electro discharge machining apparatus 1000 will be described below.

The power source 60 which is a direct current power source applies a voltage between the opposite ends of the capacitor 90, so that electric charge is accumulated in the capacitor 90 in accordance with a charge time constant. The charge time constant is determined based on values of the electric resistances 70, 80 and the capacitor 90. The electric charge accumulated in the capacitor 90 is supplied to the electrode 10 and the workpiece 150, so that electro discharge occurs between the electrode 10 and the workpiece 150. Repetition of accumulation of electric charge to the capacitor 90 and supply of the accumulated electric charge to the electrode 10 and the workpiece 150 in accordance with the charge time constant leads to generation of pulse electro discharge between the electrode 10 and the workpiece 150. The workpiece 150 is machined by the pulse electro discharge (e.g., hole machinining).

In order for the electrode 10 to be slid in the Z axis direction with respect to a machining plane (X-Y plane) of the workpiece 150, the motor controller 110 instructs the motor driver 120 to drive the motor 50. The motor driver 120 drives the motor 50. The driven motor 50 rotates the ball screw 40, thereby sliding the table 20 in the Z axis direction. As a result, the electrode 10 is slid in the Z axis direction.

Machining of the workpiece 150 is initiated by a machining initiation command by a user's key input, for example. The machining initiation command leads to accumulation of electric charge into the capacitor 90, while the motor controller 110 outputs to the motor driver 120 a command to drive the motor 50 so as to move the electrode 10 downward. The motor drive causes a distance between the electrode 10 and the workpiece 150 to be small. When the distance comes to an extent where electro discharge can be generated, pulse electro discharge is generated between the electrode 10 and the workpiece 150 to start machining of the workpiece 150.

In the above-described operation of the electro discharge machining apparatus 1000, once machining by pulse electro discharge is started, the machining is continued while the electrode 10 is moved at a predetermined feed speed. However, when an arc occurs between the electrode 10 and the workpiece 150, a current flows through the arc, which interferes with the machining. Moreover, when the electrode 10 and the workpiece 150 are electrically connected directly to each other through swarfs which enter between the electrode 10 and the workpiece 150, a current flows through the swarfs, which interferes with the machining. Such emergence of a current path through an arc, a swarf, or the like is distinguished from normal pulse electro discharge and called a short circuit in the Examples of the present invention.

In the electro discharge machining apparatus 1000, when a short circuit occurs between the electrode 10 and the workpiece 150, the switching element 140 is switched off so as to interrupt a supply path of electric charge to the electrode 10 and the workpiece 150, thereby instantaneously halting the supply of electric charge to the electrode 10 and the workpiece 150. By instantaneously halting the supply of electric charge to the workpiece 150 and the electrode 10, it is possible to instantaneously halt a short circuit occurring between the electrode 10 and the workpiece 150.

Figure 2:
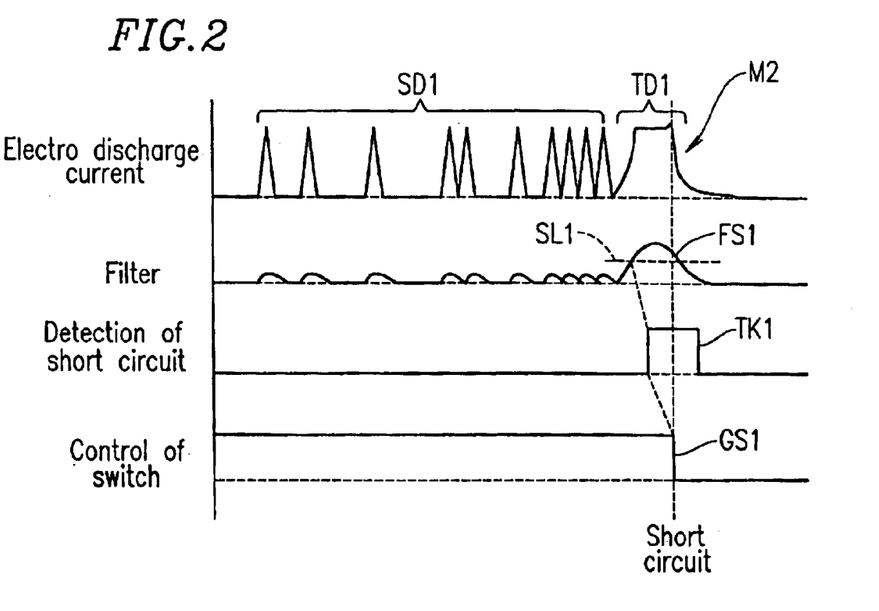
FIG. 2 is a diagram showing an operation of the electro discharge machining apparatus shown in FIG. 1A.

Referring to FIGS. 1A and 2, the above-described operation of the electro discharge machining apparatus 1000 to instantaneously halt a short circuit will be described. In the electro discharge machining apparatus 1000, the current detecting element 101 detects a current flowing between the electrode 10 and the workpiece 150. The current detecting element 101 may also detect a voltage between the electrode 10 and the workpiece 150. The current detecting element 101 outputs a current detecting result as a detection output signal M2 to the control unit 100.

The control unit 100 employs a high-order low-pass filter to remove a normal electro discharge component SD1 from the detection output signal M2. When a short circuit component TD1 is present in the detection output signal M2, the control unit 100 carries out low-pass filtering to extract a low-frequency component FS1 corresponding to the short circuit component TD1. The control unit 100 judges whether or not the extracted low-frequency component FS1 is greater than or equal to a threshold SL1. The threshold SL1 is determined based on a relationship between the power source 60 and the capacitor 90. When the control unit 100 judges that the low-frequency component FS1 is greater than or equal to the threshold SL1, the control unit 100 generates a short circuit detection signal TK1 and outputs the resultant short circuit detection signal TK1 to the switch controller 130.

When the switch controller 130 receives the short circuit detection signal TK1, the switch controller 130 switches off a switch control signal GS1 so as to switch off the switching element 140. The switching element 140 may be an FET or the like. As described above, by switching off the switching element 140 to interrupt the supply path of electric charge to the electrode 10 and the workpiece 150, a short circuit occurring between the electrode 10 and the workpiece 150 can be instantaneously halted.

A predetermined time after the switching element 140 was switched off, the switch controller 130 outputs the switch control signal GS1 so as to switch on the switching element 140. By switching on the switching element 140, pulse electro discharge is resumed between the electrode 10 and the workpiece 150. The predetermined time during which the switching element 140 remains switched off is, for example, a sufficient time such that plasma, ions, or swarfs are removed from between the electrode 10 and the workpiece 150.

As described above, when a short circuit occurs between the electrode 10 and the workpiece 150, the switching element 140 is switched off to interrupt the supply path of electric charge to the electrode 10 and the workpiece 150, thereby making it possible to instantaneously halt the short circuit generated between the electrode 10 and the workpiece 150. In addition to the above-described operation of the electro discharge machining apparatus 1000, when a short circuit occurs between the electrode 10 and the workpiece 150, a distance between the electrode 10 and the workpiece 150 is caused to be increased so as to secure a sufficient isolation distance, thereby making it possible to more reliably halt the generated short circuit.

Figure 3:
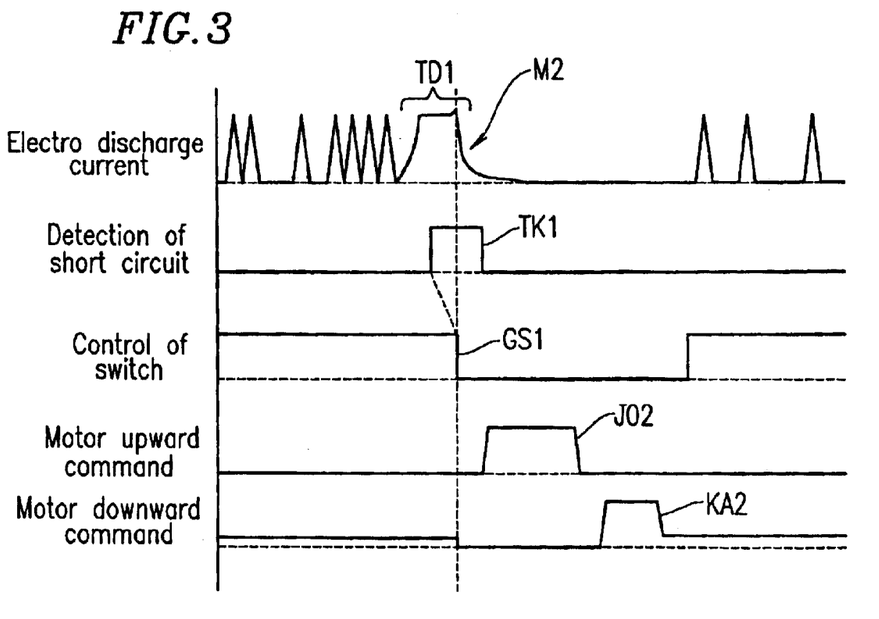
FIG. 3 is a diagram showing an operation of the electro discharge machining apparatus shown in FIG. 1A.

Referring to FIG. 3, when the detection output signal M2 contains the short circuit component TD1, the switch controller 130 switches off the switch control signal GS1 based on the short circuit detection signal TK1 generated by the control unit 100 to switch off the switching element 140. In the operation of the electro discharge machining apparatus 1000 shown in FIG. 3, the control unit 100 also outputs the short circuit detection signal TK1 to the motor controller 110. When the motor controller 110 receives the short circuit detection signal TK1, the motor controller 110 outputs an upward command signal JO2 to the motor driver 120, so that the motor driver 120 drives the motor 50 so as to move the electrode 10 upward at high speed. When the electrode 10 is raised so that a distance between the electrode 10 and the workpiece 150 is increased, a sufficient isolation distance can be secured between the electrode 10 and the workpiece 150.

After a predetermined time has passed, the motor controller 110 outputs a downward command signal KA2 to the motor driver 120. The motor driver 120 drives the motor 50 to move the electrode 10 downward, thereby restoring a distance between the electrode 10 and the workpiece 150 to an extent where electro discharge can be generated.

By moving the electrode 10 upward so as to increase a distance between the electrode 10 and the workpiece 150 while the switching element 140 is switched off, a sufficient isolation distance is secured between the electrode 10 and the workpiece 150. With such an operation, a short circuit generated between the electrode 10 and the workpiece 150 can be instantaneously and reliably halted.

When an amount of upward shift of the electrode 10 triggered by the upward command signal J02 and an amount of downward shift of the electrode 10 triggered by the downward command signal KA2 are designed to be different from each other so that the electrode 10 is brought back to a position different from a position of the electrode 10 at which a short circuit is generated, it is possible to reduce the possibility that a short circuit recurs between the electrode 10 and the workpiece 150 when electric charge is supplied therebetween.

Figure 1B:
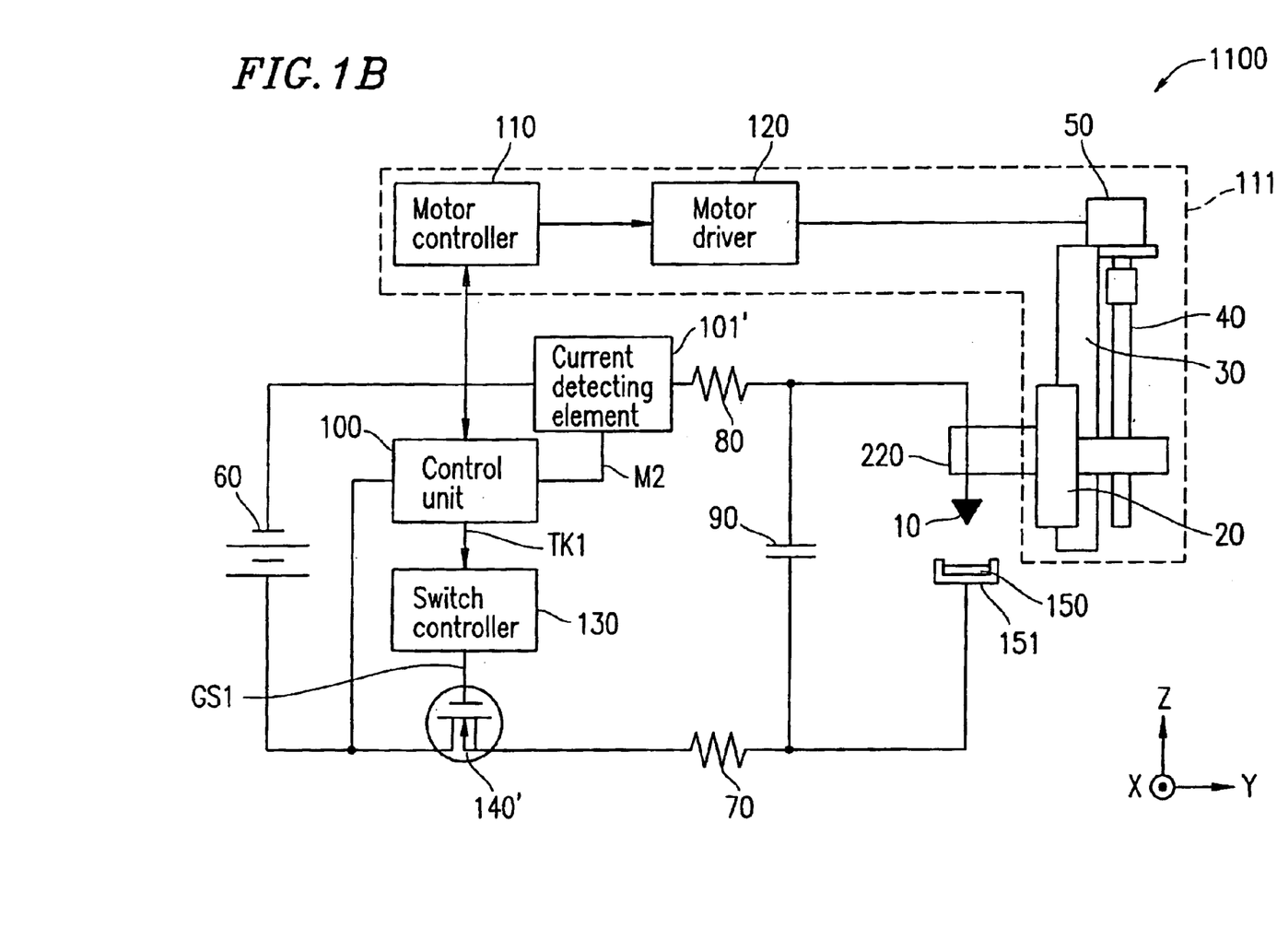
FIG. 1B is a diagram showing another electro discharge machining apparatus according to Example 1 of the present invention.

FIG. 1B show an electro discharge machining apparatus 1100 which is a variation of the electro discharge machining apparatus 1000. In the electro discharge machining apparatus 1100, a current detecting element 101' and a switching element 140' are provided between the power source 60 and the capacitor 90. Except for such a point, the structure of the electro discharge machining apparatus 1100 is the same as that of the electro discharge machining apparatus 1000. The current detecting element 101' detects a value of a current flowing between the electrode 10 and the workpiece 150 which is calculated based on a current and a voltage between the power source 60 and the capacitor 90, and outputs the detection output signal M2 to the control unit 100. The on and off of the switching element 140' is controlled by the switch controller 130 similar to the switching element 140.

Even when the current detecting element 101' and the switching element 140' are provided in the electro discharge machining apparatus 1100 as shown in FIG. 1B, the electro discharge machining apparatus 1100 can operate in a manner similar to that of the above-described electro discharge machining apparatus 1000.

Further, the switching element 140 in the electro discharge machining apparatus 1000 shown in FIG. 1A may be provided between the capacitor 90 and the electrode 10. Furthermore, a plurality of the switching element 140 may be provided at some positions of between the power source 60 and the capacitor 90, and between the capacitor 90, and the electrode 10 and the workpiece 150.

EXAMPLE 2

Figure 4:
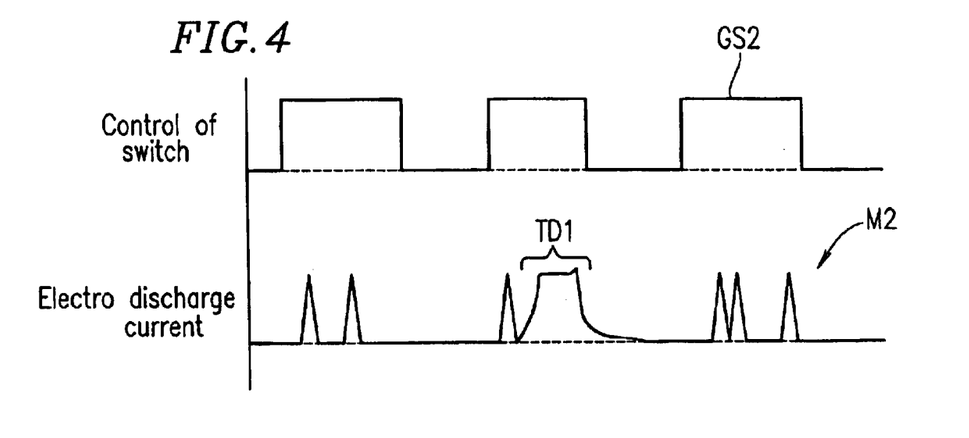
FIG. 4 is a diagram showing an operation of an electro discharge machining apparatus according to Example 2 of the present invention.

FIG. 4 shows an operation of an electro discharge machining apparatus 1000 according to Example 2 of the present invention.

When a machining liquid, such as for example deionized water, is used in machining, if a high voltage remains applied between the electrode 10 and the workpiece 150, electrolysis occurs either in the electrode 10 or the workpiece 150. Such occurrence of electrolysis may be responsible for abnormal machining of the workpiece 150, and should be prevented. In Example 2, the switch controller 130 switches alternately on and off the switching element 140 in such a manner that the duration of pulse electro discharge between the electrode 10 and the workpiece 150 is less than or equal to a predetermined time, thereby preventing the occurrence of electrolysis.

The switch controller 130 outputs a switch control signal GS2 as shown in FIG. 4, which alternately changes from on to off, to the switching element 140 so as to switch the switching element 140 on and off. A time during which the switching element 140 is switched on is in the range from the beginning of pulse electro discharge to the onset of electrolysis either in the electrode 10 or the workpiece 150. A time during which the switching element 140 is switched off may be a sufficient time for plasma and ions present between the electrode 10 and the workpiece 150 to be removed.

A time during which the switching element 140 is switched on in order to carry out at least one round of electro discharge, is greater than or equal to the duration of a pulse (pulse width) in pulse electro discharge. The pulse period of pulse electro discharge is determined by the electric resistances 70 and 80 and the capacitor 90. For example, assuming that the electric resistances 70 and 80 are each 1 KΩ and the capacitance of the capacitor 90 is 10 pF, the pulse width of pulse electro discharge is about 10 ns. Alternatively, a detecting result of the current detecting element 101 may be used to detect the pulse width of pulse electro discharge, and a time during which the switching element 140 is switched on may be designed to be greater than the detected pulse width.

A time from the beginning of pulse electro discharge to the onset of electrolysis either in the electrode 10 or the workpiece 150 varies depending on machining conditions (types of the electrode 10, the workpiece 150 and the machining liquid, voltage, temperature, etc.). Therefore, a time during which the switching element 140 is switched on may be designed based on the time from the beginning of pulse electro discharge to the onset of electrolysis, which has been previously determined under a specific set of machining conditions. For example, when the electrode 10 is made of tungsten, the workpiece 150 is made of stainless steel, a machining liquid is deionized water, and a voltage applied between the electrode 10 and the workpiece 150 is 100V, a time from the beginning of pulse electro discharge to the onset of electrolysis is about 100 ns. The present invention is not limited to this.

As described above, the on and off of the switching element 140 is alternately switched in such a manner that the duration of pulse electro discharge between the electrode 10 and the workpiece 150 is less than or equal to a predetermined time. Therefore, the occurrence of electrolysis can be prevented. By preventing the occurrence of electrolysis, abnormal machining of the workpiece 150 can be avoided.

When a short circuit occurs, the switching element 140 is switched off in a manner similar to that of Example 1, thereby making it possible to halt the short circuit.

EXAMPLE 3

Figure 5:
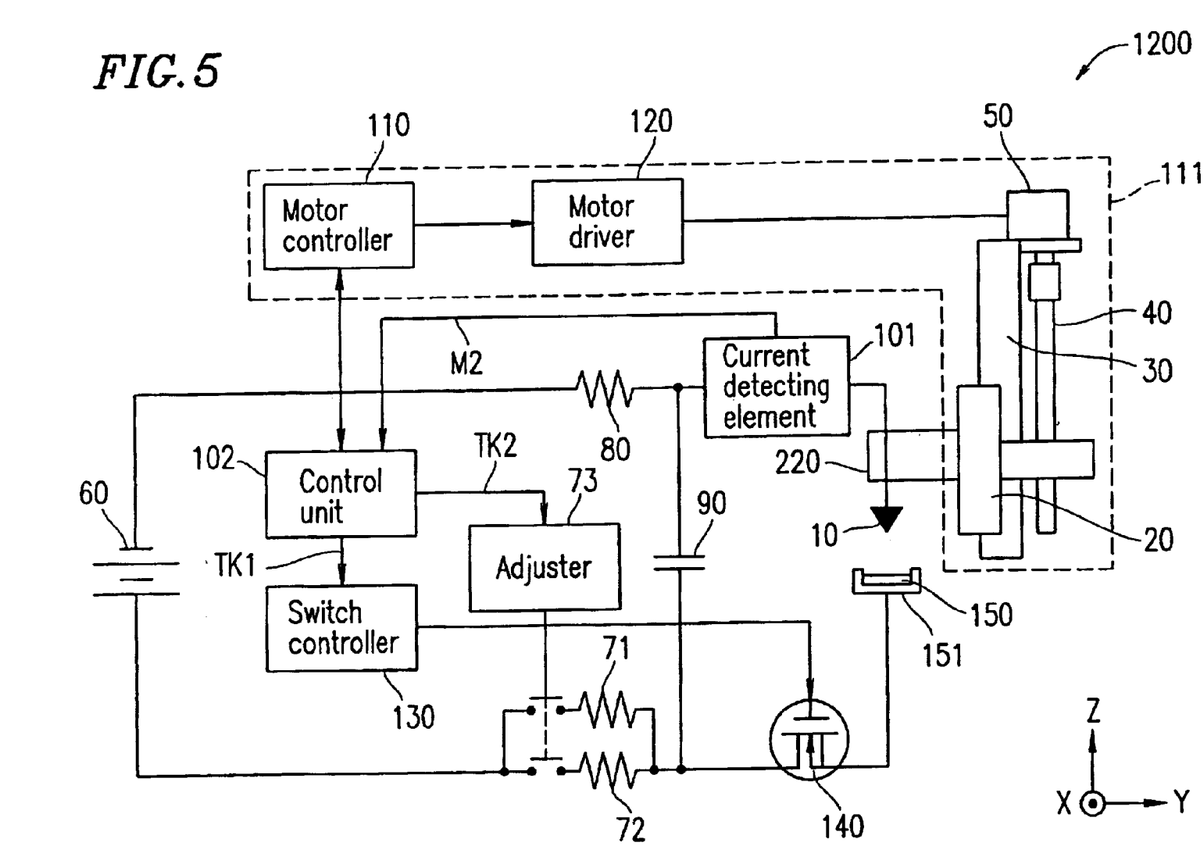
FIG. 5 is a diagram showing an electro discharge machining apparatus according to Example 3 of the present invention.

FIG. 5 shows an electro discharge machining apparatus 1200 according to Example 3 of the present invention. The electro discharge machining apparatus 1200 may be an electro discharge micromachining apparatus. The electro discharge machining apparatus 1200 comprises a control unit 102, electric resistances 71 and 72, and an adjuster 73. The adjuster 73 adjusts electric resistance between the power source 60 and the capacitor 90 by selecting one of the electric resistances 71 and 72. Except for these points, the electro discharge machining apparatus 1200 has a configuration similar to that of the electro discharge machining apparatus 1000 of Example 1.

For example, it is assumed that a 15 µm-diameter electrode rod of tungsten is used in deionized water to form a hole having a depth of 50 µm in a stainless steel plate. It is further assumed that the electric resistance 71 is selected and is 1 KΩ, the capacitance of the capacitor 90 is 10 pF, the power source 60 is 70 V. Electro discharge machining is satisfactorily carried out without occurrence of a short circuit until the depth of a hole reaches about 30 µm. However, as the hole becomes deeper from such a point, the level of the short circuit is increased, leading to interruption of the machining. The reason is considered to be that as the machining depth becomes greater, the physical electro discharge environment is changed, so that the period of pulse electro discharge is gradually shortened as shown in FIG. 6 and the short pulse electro discharge period causes a short circuit to easily occur.

In Example 3, the control unit 102 judges based on the detection output signal M2 from the current detecting element 101 whether or not a pulse electro discharge period is less than or equal to a predetermined period. The predetermined period is designed to be greater than a pulse electro discharge period such that a short circuit easily occurs. Such a predetermined period may be determined in the following manner. A pulse period such that a short circuit frequently occurs is determined based on the detection output signal M2 obtained from the current detecting element 101 during machining, and the predetermined period may be designed to be greater than or equal to the determined pulse period for each machining process.

Figure 6:
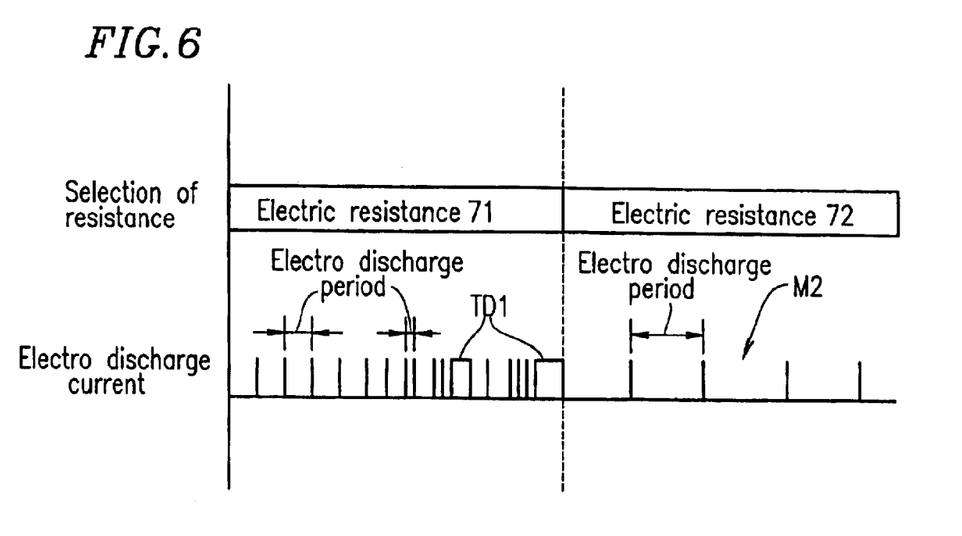
FIG. 6 is a diagram showing an operation of the electro discharge machining apparatus shown in FIG. 5.

Referring to FIGS. 5 and 6, when the control unit 102 judges that a pulse electro discharge period is less than or equal to the predetermined period, the control unit 102 outputs a resistance adjustment signal TK2 to the adjuster 73. When the adjuster 73 receives the resistance adjustment signal TK2, an electric resistance electrically connected to the power source 60 and the capacitor 90 is switched from the electric resistance 71 (e.g., 1 KΩ) to the electric resistance 72 (e.g., 5 KΩ) so as to adjust the value of electric resistance between the power source 60 and the capacitor 90. If the electric resistance value is adjusted to be increased (e.g., from 1 KΩ to 5 KΩ), a pulse electro discharge period can be made greater than the predetermined period.

Alternatively, the control unit 102 judges based on the detection output signal M2 from the current detecting element 101 whether or not a short circuit has occurred between the workpiece 150 and the electrode 10 for more than a predetermined time. In this case, when the control unit 102 judges that a short circuit has occurred between the workpiece 150 and the electrode 10 for more than the predetermined time, the control unit 102 outputs the resistance adjustment signal TK2 to the adjuster 71. Also in this case, the adjuster 73 switches the electric resistance 71 to the electric resistance 72 in accordance with the resistance adjustment signal TK2 so that the electric resistance value between the power source 60 and the capacitor 90 is adjusted. As the electric resistance value is increased, the pulse electro discharge period increases. The greater the pulse electro discharge period, the easier the generated short circuit is halted. Therefore, with a greater pulse electro discharge period, a generated short circuit can be halted.

Thus, by elongating a pulse electro discharge period, it is possible to prevent the occurrence of a short circuit between a workpiece and an electrode, or halt a generated short circuit. The occurrence of a short circuit can be avoided, thereby making it possible to shorten the entire process of electro discharge machining.

Note that there may be provided three or more electric resistances (71, 72) for adjusting the electric resistance value.

Alternatively, a variable resistor may be employed instead of the electric resistances 71 and 72. In this case, the adjuster 73 constantly adjusts a variable resistor based on the detection output signal M2 so that a pulse electro discharge period is greater than a predetermined period. Thereby, machining can be carried out without interruption of pulse electro discharge during the machining. Therefore, machining can be sped up.

In Example 3, when a short circuit occurs, the switching element 140 may be switched off in a manner similar to that of Example 1 to halt the short circuit.

In Example 3, the values of electric resistances and a capacitor are designed depending on an isolation medium, a material for a workpiece, or the like. The above-described electric resistances are not limited to 1 KΩ and 5 KΩ. The above-described capacitor is not limited to 10 pF.

In the present invention, the above-described electro discharge machining apparatuses 1000, 1100 and 1200 in Examples 1 to 3 may be employed in combination. In this case, prevention of a short circuit and electrolysis can provide a synergistic effect.

Next, the head 220 for holding the electrode 10 in the electro discharge machining apparatuses 1000, 1100 and 1200 shown in FIGS. 1A, 1B, and FIG. 5 will be described with reference to FIGS. 7A, 7B, 7C and 7D.

Figure 7A:
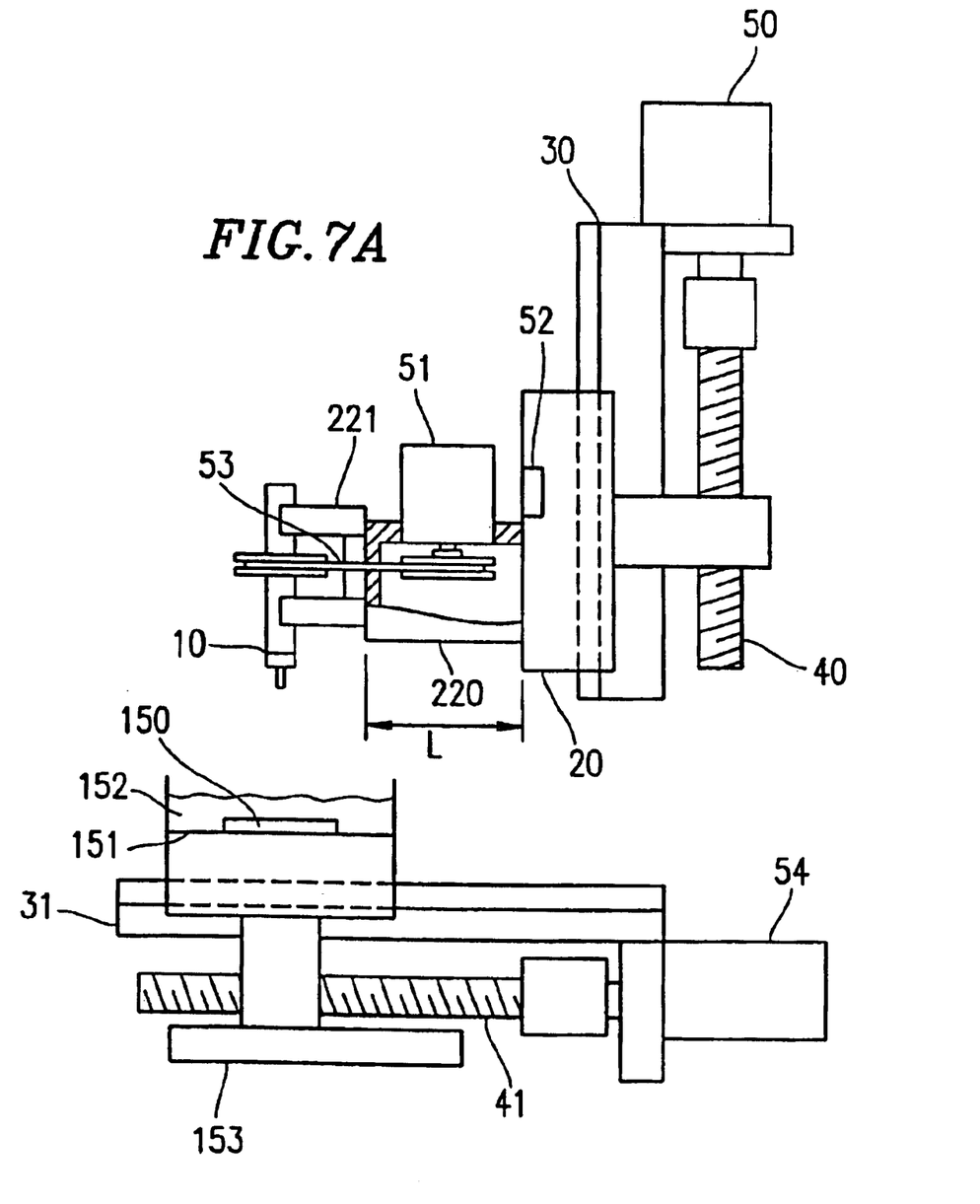
FIG. 7A is a diagram showing a head portion of the electro discharge machining apparatuses of the examples of the present invention.

Referring to FIG. 7A, the head 220 is provided and integrated with a V-axis holder 221 for holding the electrode 10 in such a manner that the electrode 10 can be rotated. The head 220 is further provided with a spindle motor 51. Rotation of the spindle motor 51 is transferred to the electrode 10 through a rotation transfer section 53. The electrode 10 may be a rotating tool electrode.

The head 220 comprises a super-invar alloy having the coefficient of thermal expansion of $0.5 \times 10^{-6}$ (a low thermal expansive substance). In the Examples of the present invention, as a super-invar alloy, LEX5 manufactured by Nippon Chuzo K.K. is employed. Any other low thermal expansive substances can be employed which have the coefficient of thermal expansion of $5 \times 10^{-6}$ or less. Further, the head 220 may be incorporated into the table 20.

A cooler 52, such as for example a cooling fin and a cooling fan, is provided in the vicinity of an outer circumferential portion of the motor 54, for example. The cooler 52 radiates heat generated in the spindle motor 51 to reduce an increase in temperature of the spindle motor 51.

The holder 151 for holding the workpiece 150 serves as a machining vessel supplied with a machining liquid 152. When rotation of the motor 51 is transferred through a ball screw 41 to the holder 151, the holder 151 is driven in a Y axis direction along a linear guide 31. The motor 54 may be driven by the motor driver 120 (FIG. 1). The holder 151 is further provided with a linear scale 153 for determining a machining position.

At the start of machining, rotation of the motor 54 causes the holder 151 holding the workpiece 150 to move to a desired position with respect to the electrode 10. Meanwhile, the head 10 is moved down toward the workpiece 150. Thereafter, micromachining is carried out by the electrode 10 while the electrode 10 is continuously rotated by the spindle motor 51. In this case, the continuously rotated spindle motor 51 generates heat during machining, and the temperature thereof is increased by about 5 degrees, for example. This heat is transferred to the head 220, so that the temperature of the head 220 is increased by about 3 degrees. Nevertheless, since the head 220 is made of a low thermal expansive substance, the head 220 substantially does not thermally expand. Therefore, even when the length L of the head 220 is 50 mm, the electrode 10 is displaced by 0.075 μm from a desired machining position. Further, as the cooler 52 suppresses heat generation by the spindle motor 51, the thermal expansion of the head 220 is made small, thereby reducing the displacement of the electrode 10.

Figure 7B:
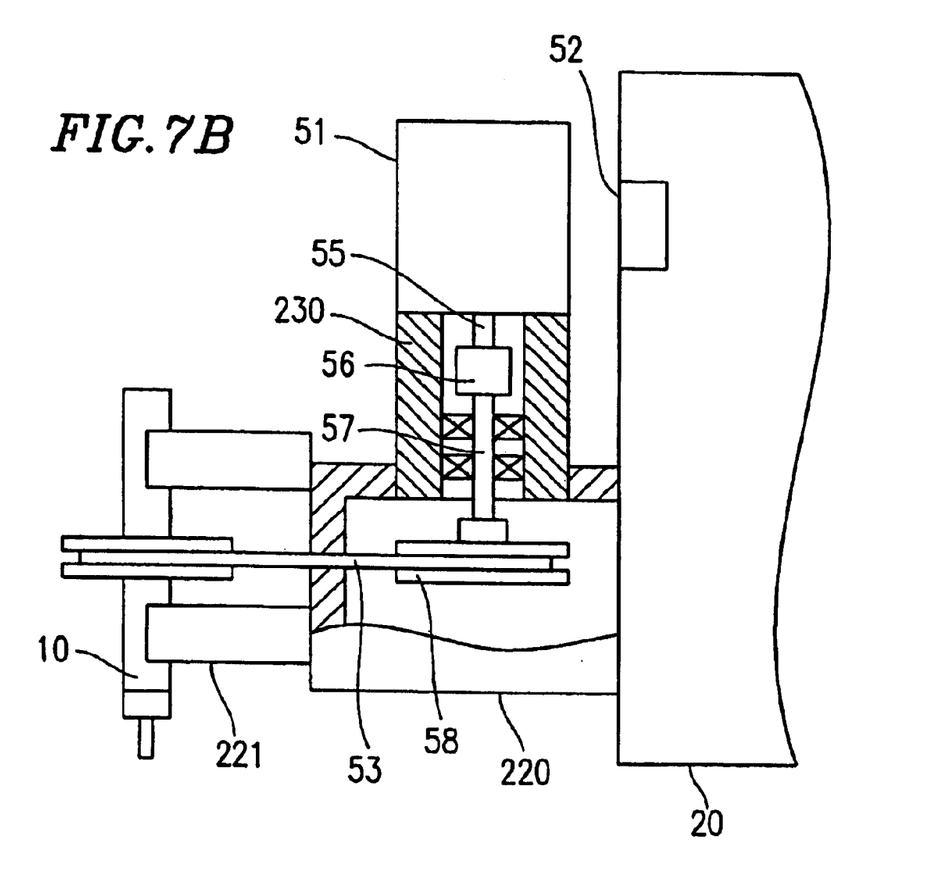
FIG. 7B is a diagram showing another head portion of the electro discharge machining apparatuses of the examples of the present invention.

As shown in FIG. 7B, a driving shaft 55 of the spindle motor 51 and a rotation shaft 57 of the rotation transfer section 58 may be coupled with each other by a coupling 56 so that the spindle motor 51 which generates heat is shifted away from the head 220. In addition, a thermal insulator 230 comprising a ceramic or the like may be provided between the spindle motor 51 and the head 220. With the thermal insulator 230, even when the temperature of the spindle motor 51 is increased, for example, by about 5 degrees due to heat generation of the spindle motor 51, an increase in the temperature of the head 220 is suppressed to about 0.5 degrees or less, whereby the electrode 10 is displaced only by 0.43 μm from a desired machining position.

Figure 7C:
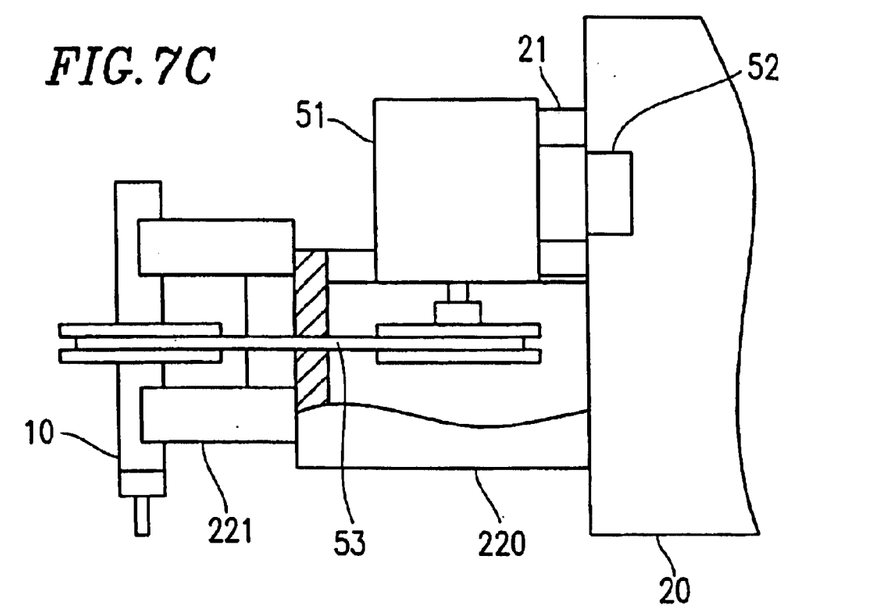
FIG. 7C is a diagram showing another head portion of the electro discharge machining apparatuses of the examples of the present invention.
Figure 7D:
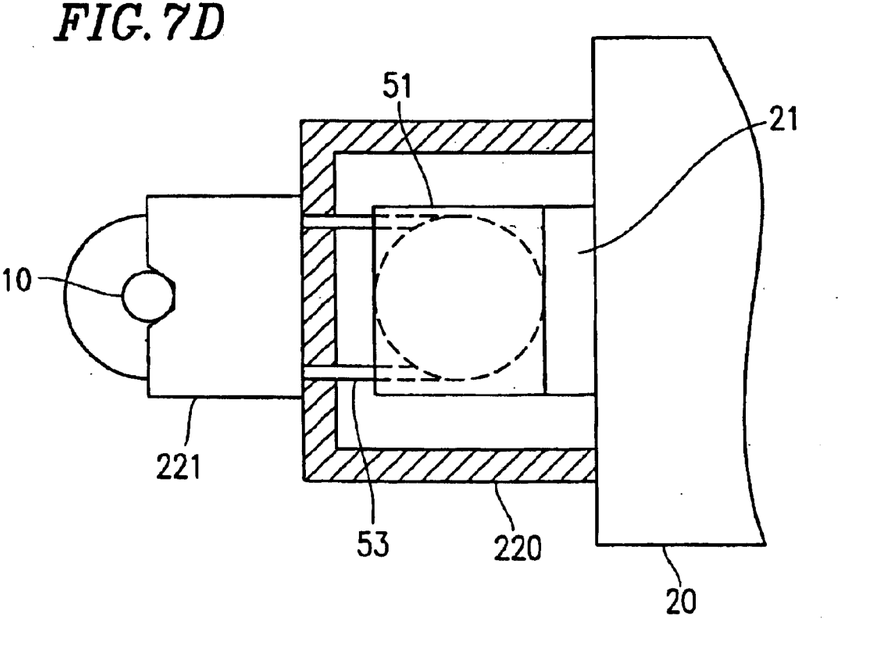
FIG. 7D is a diagram showing another head portion of the electro discharge machining apparatuses of the examples of the present invention.

As shown in FIGS. 7C and 7D, the spindle motor 51 is provided in the table 20 through a coupler 21, whereby a space is set between the spindle motor 51 and the head 220. Therefore, even when the spindle motor 51 generates heat and the temperature thereof is increased, for example, by about 5 degrees, the heat is transferred to the head 220 via an air but not directly. Therefore, an increase in the temperature of the head 220 is suppressed to about 0.5 degrees or less, whereby the electrode 10 is displaced only by 0.43 μm from a machining position.

Thus, the transfer of heat generated by the spindle motor 51 to the head 220 is significantly reduced, whereby it is possible to prevent the displacement of the electrode 10 due to heat generation of the spindle motor 51 during long-time machining, and to achieve positioning of the electrode 10 with high precision.

According to the present invention, when it is judged that a short circuit occurs between a workpiece and an electrode, a switching element is switched off during a predetermined time. By switching off the switching element so as to block a supply path of electric charge to the workpiece and the electrode, it is possible to instantaneously halt supply of electric charge to the workpiece and the electrode. Thereby, a short circuit occurring between the workpiece and the electrode can be instantaneously halted. Further, in addition to the switching off of the switching element during the predetermined time, a distance between the workpiece and the electrode is increased, whereby the short circuit occurring between the workpiece and the electrode can be more reliably halted. Furthermore, since a voltage between the workpiece and the electrode is decreased by switching off the switching element, it is possible to prevent electrolysis in the workpiece and the electrode, which may be responsible for abnormal machining.

According to the present invention, a switching element is alternately switched on and off so that the duration of the pulse electro discharge is less than or equal to a predetermined time. If pulse electro discharge is sustained for more than the predetermined time, electrolysis occurs in an electrode and a workpiece. Therefore, by causing the duration of pulse electro discharge to be less than or equal to the predetermined time, it is possible to prevent electrolysis in electrode and workpiece which may be responsible for abnormal machining.

According to the present invention, when a pulse electro discharge period is determined to be less than or equal to a predetermined period, an electric resistance value between a power source and a capacitor is adjusted so that the pulse electro discharge period is greater than the predetermined period. The shorter the pulse electro discharge period, the more likely the occurrence of a short circuit between a workpiece and an electrode. By elongating the pulse electro discharge period to more than the predetermined period, it is possible to prevent the occurrence of a short circuit between the workpiece and the electrode.

According to the present invention, when it is determined that the occurrence of a short circuit between a workpiece and an electrode has continued for a predetermined time or more, an electric resistance value between a power source and a capacitor is adjusted so as to elongate a pulse electro discharge period. The greater the pulse electro discharge period, the more easily the short circuit is halted. By elongating the pulse electro discharge period, it is possible to halt the generated short circuit.

According to the present invention, a head for holding an electrode is made of a low thermal expansive substance. Therefore, even when heat generated by a motor is transferred to the head, the head substantially does not expand, whereby the electrode can be prevented from being displaced from a machining position.

According to the present invention, a thermal insulator is provided between a head for holding an electrode and a motor. Therefore, heat generated by a motor is not substantially transferred to the head, and the head substantially does not expand, whereby the electrode can be prevented from being displaced from a machining position.

According to the present invention, space is set between a head for holding an electrode and a motor. Therefore, heat generated by a motor is not substantially transferred to the head, the head substantially does not expand, whereby the electrode can be prevented from being displaced from a machining position.

What is claimed is:

1. An electro discharge machining apparatus, comprising:
   a first holder for holding a workpiece;
   a tool electrode arranged opposite to the workpiece;
   a capacitor charged by a power source device through a resistor;
   a current detecting element for detecting a short circuit;
   a switching element intervening a discharge circuit between the capacitor, and at least one of the tool electrode, the workpiece and the power source;
   a control unit for controlling switching timing in accordance with a result of detecting a short circuit,
   wherein a short circuit detection signal is input, the switching element is turned off and, after predetermined time, the switching element is turned on.

2. An electro discharge machining apparatus according to claim 1, further comprising:
   a drive control unit for controlling movement of the tool electrode, wherein the short circuit detection signal is input, the tool electrode is moved to increase a gap between the tool electrode and the workpiece.

3. An electro discharge machining apparatus according to claim 1, further comprising:

a motor for rotating the tool electrode; and a second holder for holding the motor and the tool electrode, wherein the second holder is made of a low thermal expansive substance.

4. An electro discharge machining apparatus according to claim 3, wherein the coefficient of thermal expansion of the low thermal expansive substance is $5 \times 10^{-6}$ or less.

5. An electro discharge machining apparatus according to claim 3, wherein the low thermal expansive substance is an invar alloy.

6. An electro discharge machining apparatus according to claim 1, further comprising:

a motor for rotating the tool electrode; and a second holder for holding the motor and the tool electrode, wherein an thermal isolator is equipped between the motor and the second holder.

7. An electro discharge machining apparatus according to claim 1, further comprising:

a motor for rotating the tool electrode; and a second holder for holding the tool electrode, wherein space is set between the motor and the second holder.

8. An electro discharge machining apparatus, comprising:

a first holder for holding a workpiece;

a tool electrode arranged opposite to the workpiece;

a capacitor charged by a power source device through a resistor; and a switching element intervening a discharge circuit between the capacitor, and at least one of the tool electrode, the workpiece and the power source; and a switch controller for controlling on and off of the switching element, wherein the switching element alternatively is turned on and off so that duration of the pulse electro discharge is less than or equal to a predetermined time.

9. An electro discharge machining apparatus according to claim 8, wherein the predetermined time is a time from the beginning of the pulse electro discharge to the onset of electrolysis in one of the tool electrode and the workpiece.

10. An electro discharge machining apparatus according to claim 8, further comprising:

a motor for rotating the tool electrode; and a second holder for holding the motor and the tool electrode, wherein the second holder is made of a low thermal expansive substance.

11. An electro discharge machining apparatus according to claim 10, wherein the coefficient of thermal expansion of the low thermal expansive substance is $5 \times 10^{-6}$ or less.

12. An electro discharge machining apparatus according to claim 10, wherein the low thermal expansive substance is an invar alloy.

13. An electro discharge machining apparatus according to claim 8, further comprising:

a motor for rotating the tool electrode; and a second holder for holding the motor and the tool electrode, wherein an thermal isolator is equipped between the motor and the second holder.

14. An electro discharge machining apparatus according to claim 8, further comprising:

a motor for rotating the tool electrode; and a second holder for holding the tool electrode, wherein space is set between the motor and the second holder.

* * * * *